(12) United States Patent
Meyer et al.

(10) Patent No.: US 6,394,253 B2
(45) Date of Patent: May 28, 2002

(54) CLUTCH ACTUATING APPARATUS

(75) Inventors: Gerhard Meyer, Lehrberg; Ludwig Winkelmann, Erlangen; Dieter Adler, Herzogenaurach, all of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/735,185

(22) Filed: Dec. 8, 2000

Related U.S. Application Data (63) Continuation of application No. PCT/EP99/03546, filed on May 22, 1999.

(30) Foreign Application Priority Data

Jun. 10, 1998  (DE) ......................................... 198 25 965

(51) Int. Cl.$^7$ ............................................. F16D 25/08
(52) U.S. Cl. ................................ 192/85 CA; 192/91 A
(58) Field of Search .................... 192/85 CA, 91 A, 192/98

(56) References Cited

U.S. PATENT DOCUMENTS

| | | | |
|---|---|---|---|
| 4,561,531 A | * 12/1985 | Young et al. | ........... 192/85 CA |
| 5,409,091 A | 4/1995 | Reik et al. | |
| 5,450,934 A | 9/1995 | Maucher | |
| 5,620,076 A | * 4/1997 | Voit et al. | ................ 192/91 A |
| 5,632,706 A | 5/1997 | Kremmling | |
| 5,865,288 A | * 2/1999 | Thomire et al. | ........ 192/85 CA |
| 6,035,990 A | * 3/2000 | Peschke | ................. 192/85 CA |
| 6,056,446 A | * 5/2000 | Welter et al. | ............. 192/91 A |

FOREIGN PATENT DOCUMENTS

| | | | |
|---|---|---|---|
| DE | 34 27 791 A1 | * 1/1986 | ............... 192/91 A |
| DE | 43 13 346 A 1 | 10/1994 | |
| EP | 0 168 932 A1 | 1/1986 | |
| FR | 2 757 590 | 6/1998 | |
| GB | 2 259 555 | 3/1993 | |
| WO | WO 98/28552 | 7/1998 | |
| WO | WO 99/30057 | 6/1999 | |

* cited by examiner

*Primary Examiner*—Richard M. Lorence
(74) *Attorney, Agent, or Firm*—Darby & Darby (57) ABSTRACT

A slave cylinder which serves to disengage the friction clutch between the output shaft of the engine and the transmission in the power train of a motor vehicle has a housing affixed to the case of the transmission and having an internal surface coaxial with and spacedly surrounding the cylindrical external surface of a hollow cylindrical guide coaxial with and surrounding the output shaft. An annular piston of the slave cylinder is reciprocable between the two cylindrical surfaces and carries a clutch release bearing at one end. The other end of the piston is adjacent an annular plenum chamber of the slave cylinder. An annular seal between an end portion of the guide at the transmission case and an adjacent annular centering portion of the housing is installed in such a way that it does not extend radially outwardly beyond the internal surface of the housing, i.e., radially of and beyond the plenum chamber.

11 Claims, 7 Drawing Sheets

CLUTCH ACTUATING APPARATUS

This is a continuation of International application Ser. No. PCT/EP99/03546, filed May 22, 1999, the entire disclosure of which is incorporated herein by reference.

BACKGROUND OF THE INVENTION

The invention relates to improvements in fluid-operated motors in general, and more particularly to improvements in apparatus which can be utilized in the power trains of motor vehicles to change the condition of engageable-disengageable torque transmitting devices. Still more particularly, the invention relates to improvements in apparatus which can be utilized with advantage to change the condition of friction clutches serving to establish or to interrupt a torque transmitting connection between a prime mover (such as an internal combustion engine) and a transmission or another torque-receiving unit in the power train of a motor vehicle.

In many presently utilized types of motor vehicles, the clutch actuating apparatus comprises a first hydraulic cylinder and piston unit known as slave cylinder and serving to disengage the friction clutch in response to shifting of its piston relative to its cylinder (hereinafter called housing) as a result of admission into the housing of a flow of pressurized hydraulic fluid from a second hydraulic cylinder and piston unit known as master cylinder. Reference may be had, for example, to commonly owned U.S. Pat. No. 5,632,706 granted May 27, 1997 to Kremmling et al. for "MOTOR VEHICLE WITH ELECTRONIC CLUTCH MANAGEMENT SYSTEM". In the patented power train, the piston of the slave cylinder is arranged to pivot a lever serving to shift a release bearing which is arranged to change the conicity of a diaphragm spring forming part of the friction clutch and serving to urge a pressure plate against the friction linings of a clutch disc as long as the clutch is engaged. The diaphragm spring is free to reengage the clutch as soon as the piston of the slave cylinder is free or is caused to return to its retracted position in the housing of the slave cylinder. When the clutch is engaged, it causes or enables the output shaft (such as a crankshaft or a camshaft) of the engine to transmit torque to a change-speed transmission so that the latter can transmit torque to the front and/or rear wheels of the motor vehicle, e.g., by way of a differential.

The slave cylinder is or can be coaxial with the output shaft of the engine, and its housing can be separably mounted on the case of the transmission. The piston of the slave cylinder can constitute an annular member which is slidable in an axial bore or hole of the housing and slidably surrounds a sleeve-like guide which is sealingly and fixedly (such as non-rotatably and/or non-shiftably) affixed to the housing and/or to another stationary part, e.g., to the transmission case. The piston, the housing and the sleeve-like guide (hereinafter called guide for short) define an annular plenum chamber which can receive pressurized hydraulic fuid (such as oil) from the master cylinder. The rear end portion of the piston carries an annular sealing member which is in sealing engagement with but can slide along the internal surface of the housing as well as along the external surface of the guide. The front end portion of the piston carries or indirectly transmits motion to a release bearing which can disengage the friction clutch in response to admission of pressurized hydraulic fluid into the plenum chamber of the slave cylinder. As already mentioned above, the release bearing can be coaxial with the output shaft of the engine and with the diaphragm spring of the clutch, or it can change the conicity of the diaphragm spring by way of a lever (e.g., the so-called clutch fork).

A slave cylinder of the just outlined character is described and shown, for example, in published German patent application Ser. No. 43 13 346 A1. The guide is made in accordance with a non-cutting shaping technique (e.g., in a deep drawing machine) and one of its ends is provided with a flange adjacent the transmission case and form-lockingly connected with the housing of the slave cylinder. The flange can also serve as a boundary for one end of the annular plenum chamber of the slave cylinder. In addition, an axially projecting part of the flange can perform a centering function in that it extends into a complementary recess of the housing.

When the slave cylinder is properly assembled, the annular flange of the guide is clamped between the transmission case and a part of the clutch disengaging unit to thus hold the guide in a predetermined axial position. The means for establishing a seal between the guide and the housing of the slave cylinder comprises an annular seal which is radially offset relative to the annular plenum chamber. When such annular seal is acted upon by pressurized hydraulic fluid, it provides a relatively large effective pressurized surface extending from the external surface of the guide to the seal, i.e., radially of and well beyond the cross-sectional area of the plenum chamber. This causes the housing of the slave cylinder to undergo a pronounced stress. Therefore, the dimensions of the housing must be increased accordingly and/or the quality of the material of the housing must be selected with a view to ensure that the slave cylinder and its parts will be capable of withstanding the developing stresses (particularly deforming stresses), preferably during the entire useful life of the power train.

Other presently known types of slave cylinders for use in the power trains of motor vehicles are disclosed in pubished UK patent application Serial No. 2 259 555 of Grosspletsch et al., in published French patent application Serial No. 2 597 590, and in published European patent application Serial No. 0 168 932. The disclosure of the commonly owned German priority application Serial No. 198 25 965.4 (filed Jun. 10, 1998) as well as that of each U.S. and/or foreign patent and/or patent application identified in the specification of the present application is incorporated herein by reference.

OBJECTS OF THE INVENTION

An object of the invention is to provide a slave cylinder wherein the sealing device(s) between the constituents of the slave cylinder is or are simpler, more compact and less expensive than, but at least as reliable as, in presently known slave cylinders.

Another object of the invention is to provide a slave cylinder wherein the seal between the tubular guide and the housing is constructed, assembled and installed in such a way that these parts are not subjected to stresses which would necessitate the utilization of bulkier and/or otherwise more expensive parts.

A further object of the invention is to provide a novel housing and a novel tubular guide for use in the slave cylinder of a clutch disengaging system in the power train of a motor vehicle.

An additional object of the invention is to provide a novel and improved disengaging unit for the friction clutches of power trains in motor vehicles.

Still another object of the invention is to provide a novel and improved method of establishing one or more seals between selected constituents of the clutch actuating apparatus in the power train of a motor vehicle.

A further object of the present invention is to provide a novel and improved arrangement of confining and locating one or more sealing elements between the constituents of a slave cylinder in a clutch engaging-disengaging assembly forming part of the clutch actuating apparatus in the power train of a motor vehicle.

SUMMARY OF THE INVENTION

The invention is embodied in a fluid-operated apparatus which can be utilized as a clutch actuating apparatus in the power train of a motor vehicle, for example, in a power train wherein a shaft (such as the output shaft of an engine or another prime mover or the input shaft of a change-speed transmission or another torque-receiving unit) is rotatable about a predetermined axis. The improved actuating apparatus can constitute a slave cylinder which is actuatable to engage and/or disengage a friction clutch and comprises a support (such as the case of a change-speed transmission), a housing or cylinder which is separably or more or less permanently mounted on the support and has a cylindrical internal surface coaxial with and spacedly surrounding the aforementioned shaft, and a tubular guide which surrounds the shaft and has a cylindrical external surface coaxial with and spacedly surrounded by the internal surface of the housing. The housing has a preferably annular centering portion and the guide has an end portion which is centered by the annular portion of the housing. The apparatus further comprises at least one annular sealing element which is interposed between the end portion of the guide and the centering portion of the housing. The internal surface of the housing is located at a first radial distance from the predetermined axis and the radially outermost portion of the at least one sealing element is disposed at a second radial distance from such axis; the second radial distance at most equals but can be less or even considerably less than the first distance. Still further, the improved apparatus comprises an annular piston which is coaxial with and is reciprocable between the internal and external surfaces and defines with such surfaces (i.e., with the guide and the housing) an annular plenum chamber which can receive a pressurized fluid (preferably a hydraulic fluid) from a suitable source, e.g., from a master cylinder in the power train of the motor vehicle.

In accordance with a presently preferred embodiment, the improved apparatus further comprises means (such as mating male and female coupling members) for separably coupling the housing to its support (such as to the aforementioned housing or case of a change-speed transmission).

That end portion of the piston which is remote from the plenum chamber and from the centering portion of the housing can serve to support and to reciprocate a suitable clutch release bearing, e.g., a bearing which can serve to tilt a diaphragm spring relative to the housing of a friction clutch in the power train of a motor vehicle. Reference may be had, for example, to FIG. 2 of commonly owned U.S. Pat. No. 5,409,091 granted Apr. 25, 1995 to Reik et al. for "AUTOMATICALLY ADJUSTABLE FRICTION CLUTCH".

The housing can comprise or support means for maintaining the guide in a predetermined axial position relative to the internal surface and the centering portion of the housing.

The end portion of the guide can include an annular flange which extends substantially radially of and away from the predetermined axis; such end portion of the guide and the adjacent portion of the housing (such as the aforementioned centering portion) can define an annular compartment which is disposed radially outwardly of the annular flange. The compartment can be provided with an open side which confronts the centering portion of the housing, and the end portion of the guide can further include a second annular flange which is located radially outwardly of the annular compartment. At least one of the two annular flanges can be disposed in a plane which is at least substantially normal to the predetermined axis. An end face of the centering portion of the housing can confront the open side of the annular compartment or can be located in such annular compartment.

The guide can constitute a converted blank which has been treated in a noncutting shaping machine, e.g., in a press, in a deep drawing machine or the like.

The end portion of the guide is or can be adjacent the support for the housing and can include a flange which extends at least substantially radially of and away from the predetermined axis and can be affixed to the centering portion of the housing.

The guide includes a main portion which is surrounded by the plenum chamber and by the piston; the diameter of the radially outermost part of the end portion of the guide can exceed, and even greatly exceed, the outer diameter of the main portion of the guide. The ratio of the outer diameter of the main portion to the diameter of the radially outermost part of the end portion of the guide can be between 1 and 1.2.

As already mentioned above, the end portion of the guide can include at least one flange which extends at least substantially radially of and away from the predetermined axis; an end face of the housing cooperating with such guide can be provided with a recess for the at least one flange of the guide. The guide can further include a cylindrical extension which is or which can be of one piece with the radially outermost portion of the at least one flange and extends axially and away from the plenum chamber. The centering portion of the housing can include an annular or tubular envelope which surrounds the cylindrical extension; this enhances the centering action of the housing and reduces the likelihood of undesirable tilting of the guide relative to the centering portion of the housing.

The aforementioned second annular flange of the end portion of the guide (i.e., the annular flange which is located radially outwardly of the annular compartment) can abut an at least substantially radially extending surface of the housing; such surface can be in sealing engagement with the second annular flange of the end portion of the guide.

The centering portion of the housing can at least partially fill the annular compartment.

The arrangement is or can be such that the end portion of the guide is centered by the centering portion of the housing at the internal surface of the housing and/or by two discrete portions of the housing one of which can include or constitute the centering portion.

The sealing element which operates between the centering portion of the housing and the end portion of the guide can be installed in a recess provided therefor in an end face of the housing.

Alternatively, and if the centering portion extends into the aforementioned annular compartment defined by the end portion of the guide and the housing, an internal surface of such centering portion can be provided with an annular recess which is located in the annular compartment and receives the sealing element.

Still further, it is possible to install the sealing element in an annular recess provided therefor in the external surface of the end portion of the guide; the centering portion of the housing preferably surrounds such recess and sealingly engages the sealing element.

It is also possible to install the sealing element in an internal recess of centering portion of the housing; such housing and the guide can be provided with cooperating means for locating the guide in a preselected axial position relative to the housing, i.e., relative to the centering portion and the sealing element in the internal recess of the centering portion. The locating means can comprise an internal shoulder provided in the housing and extending radially outwardly from the predetermined axis, and such locating means further comprises an external projection provided at the end portion of the guide adjacent the internal shoulder.

If the sealing element is received in an external surface of the end portion of the guide, the centering portion of the housing preferably surrounds the recess and sealingly engages the sealing element. Such apparatus can further comprise at least substantially annular retaining means anchored in the external surface of the end portion of the guide and cooperating with the centering portion to prevent the sealing element from leaving the recess.

The housing can comprise means for maintaining the guide in a predetermined (optimum) axial position relative to the internal surface; such means can be designed to operate by snap action. The end portion of the guide can be provided with a tubular extension, and the means for maintaining the guide in a predetermined axial position relative to the internal surface of the housing can include at least one prong, arm, tooth or a like part provided at the centering portion of the housing and engaging the extension.

The centering portion of the housing can be provided with a surface which confronts the adjacent axial end of the plenum chamber and is formed with an annular recess for the end portion of the guide.

The end portion of the guide can be a press fit in the centering portion of the housing. For example, the external surface of the guide can include a smaller-diameter portion which is surrounded by the piston, and a larger-diameter portion which is a press fit in the centering portion of the housing. The larger-diameter portion of the external surface of the guide can have a diameter which is approximately three times the length of the centering portion of the housing.

The end portion of the guide and the centering portion of the housing can define a bayonet mount which serves to hold the housing and the guide against movement relative to each other, particularly against movement longitudinally and circumferentially of the predetermined axis.

The internal surface of the housing, and more particularly that portion of such internal surface which is defined by the centering portion, can be provided with an annular recess for the sealing element; the latter surrounds the adjacent portion of external surface of the guide and the guide can include an annular flange which extends radially outwardly beyond the external surface of the guide and abuts the sealing element. The centering portion of the housing can be provided with a deformed portion which overlies the flange and is utilized to hold the guide against axial movement relative to the housing.

The guide can be caulked to the housing. It is also possible to bond the end portion of the guide to the centering portion. Furthermore, a portion of the external surface or the entire external surface of the guide can be anodized; the anodized portion of such external surface can abut that portion of the internal surface of the housing which is provided on the centering portion.

Still further, it is possible to provide a film of plastic material on that portion of external surface of the guide which abuts the internal surface of the housing.

That (second) end portion of the guide which is remote from the centering portion of the housing can include a radially inwardly extending part which is form-lockingly and/or otherwise engaged by a stop serving to limit the extent of axial movement of the piston in a direction away from the centering portion of the housing. For example, the stop can engage the aforementioned part at the second end portion of the guide by snap action.

The internal surface of the housing and the external surface of the guide can define a relatively narrow annular clearance which is sealed by the sealing element and is adjacent the centering portion of the housing. The guide and/or the housing can be provided with one or more annular corrugations which extend from one of the annular surfaces to the other surface adjacent the sealing element. The corrugation or corrugations can force-lockingly engage the guide and/or the housing.

In accordance with a highly advantageous feature of the present invention, the housing can comprise a hollow cylindrical inner wall which surrounds the shaft and is surrounded by the guide. The guide can sealingly engage the wall at one end and the apparatus can further comprise means for preventing axial movements of the guide relative to the wall; such preventing means can be disposed at the other end of the guide.

At least a portion of the housing can consist of a suitable plastic material.

Furthermore, at least a portion of the guide can consist of a metallic material, such as steel or aluminum.

The novel features which are considered as characteristic of the invention are set forth in particular in the appended claims. The improved clutch actuating apparatus itself, however, both as to its constuction and the modes of assembling, installing and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
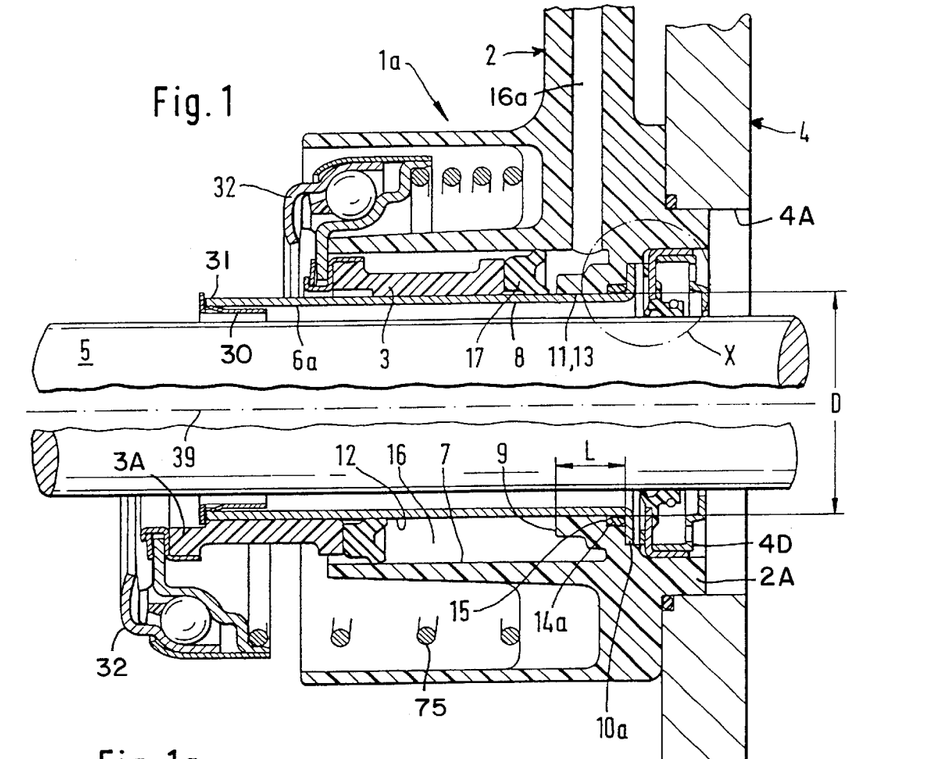
FIG. 1 is a fragmentary axial sectional view of a fluid-operated clutch actuating apparatus which employs a sleeve-like tubular guide cooperating with a housing to confine an annular sealing element and to guide an annular piston in accordance with a first embodiment of the present invention.

FIG. 1 illustrates a portion of a fluid-operated apparatus 1a which can be utilized in the power train of a motor vehicle to engage or disengage a clutch, e.g., a friction clutch which is set up to transmit torque between the rotary output element of a prime mover (such as the camshaft or the crankshaft of an internal combustion engine) and the input element of a change-speed transmission. For example, the apparatus 1a can constitute a hydraulically operated slave cylinder which can be installed in a power train of the type shown in FIG. 1 of commonly owned U.S. Pat. No. 5,450,934 (granted Sep. 19, 1995 to Maucher for "FRICTION CLUTCH") to engage or disengage an automatically adjustable friction clutch between the engine and the transmission which latter can transmit torque to the axles of the front and/or rear wheels by way of a differential.

The apparatus 1a (hereinafter called cylinder or slave cylinder) comprises a plastic cylinder or housing 2 for a reciprocable annular piston 3. The housing 2 is separably coupled to a support 4, e.g., to the case of a manually or automatically shiftable change-speed transmission. The coupling comprises a male coupling member 2A at the right-hand axial end of the housing 2 and a complementary female coupling member 4A forming part of or installed in the support 4. The housing 2 is coaxial with and is spaced apart from a shaft 5 which transmits torque to the transmission including the case or support 4 when the clutch is engaged, e.g., when the piston 3 assumes an axial position in which the clutch (such as the clutch shown in the lower right-hand portion of FIG. 1b in the aforementioned U.S. Pat. No. 5,632,706 to Kremmling et al.) is engaged.

The piston 3 has a cylindrical internal surface which is reciprocable along the complementary cylindrical external surface 12 of a tubular sleeve-like guide 6a. The right-hand end portion 10a of the guide 6a is received, at least to a large extent, in the surrounding centering portion 9 of the housing 2. The latter has an axial bore or hole 7 for the piston 3, for an annular seal 17 at the right-hand axial end of the piston, and for the main or median portion 8 of the guide 6a. The sleeve-like guide 6a can be made of a metallic material, such as steel, in a deep drawing or other suitable machine, i.e., without necessarily resorting to a material removing treatment. The end portion 10a of the guide 6a is or can be a press fit in the centering portion 9; the inner diameter of this centering portion is less than the diameter of the bore or hole 7.

The aforementioned right-hand end portion 10a of the guide 6a includes a flange which extends radially outwardly away from the common axis 39 of the parts 2, 3, 5, 6a and abuts the adjacent radially extending annular end face 2B (see FIG. 1a) of the centering portion 9. An annular sealing element 14a is installed between the cylindrical external surface 12 of the guide 6a and the internal surface 13 of the centering portion 9 to seal the respective end portion of a cylindrical plenum chamber 16 for the piston 3. As can be best seen in FIG. 1a, the adjacent surfaces 12, 13 of the guide 6a and the housing 2 define a narrow annular clearance 11 which communicates with the plenum chamber 16 and with an annular recess 15 in the internal surface 13. The recess 15 receives the sealing element 14a in such a way that the latter is compressed and deformed, i.e., that the clearance 11 is sealed from the atmosphere.

The configuration, the mode of installation within the housing 2 and the piston 3, and the mode of sealing of the guide 6a entail a reduction of the size of that portion of the guide which is subjected to elevated hydraulic pressures. Thus, when the slave cylinder 1a is in actual use, the area of the pressurized part is determined primarily by the dimensions of the annular recess 15 for the seal 14a. Since the outer diameter of the plenum chamber 16 exceeds the outer diameter of the recess 15 (i.e., since the plenum chamber extends radially outwardly beyond the recess), there are no resultant forces acting between the guide 6a and the housing 2. Thus, the entire region which is subjected to the action of axially operating forces in actual use of the slave cylinder 1a is limited to the ring-shaped cross-sectional area of the plenum chamber. Otherwise stated, the radial dimension of the annular recess 15 for the annular seal 14a does not effect the development of any forces which would be superimposed upon other forces. Consequently, when the slave cylinder 1a is in actual use, i.e., when the plenum chamber 16 receives (at 16a) pressurized hydraulic fluid to cause the piston 3 to move axially of the housing 2 and guide 6a, this does not result in the development of an undesirable axial force component acting in a direction toward the end portion 10a of the guide 6a.

In order to ensure that, once properly installed in the housing 2, the guide 6a remains in the optimum position and does not tend to lie askew, the ratio of the axial length L of the centering portion 9 to the diameter D of the internal surface 13 of the centering portion (i.e., the diameter of the external surface 12 of the guide 6a) is selected to match a preselected value. It has been ascertained that a very satisfactory ratio of D to L is when D equals or exceeds 3L. Furthermore, this ensures a highly satisfactory guidance of the piston 3 along the external surface 12 of the guide 6a.

That portion of the external surface 12 of the guide 6a which is a press fit in the surface 13 of the centering portion 9 of the housing 2 has a diameter which preferably slightly exceeds the outer diameter of the remaining major portion 8 of this guide. Such difference between the two diameters of the external surface 12 of the guide 6a ensures that the surface 12 is not damaged (such as grooved, scratched and/or deformed) during introduction of the guide 6a into the centering portion 9. Any damage to the surface 12 could adversely affect the guidance of the piston 3 in actual use of the slave cylinder 1a.

Figure 1A:
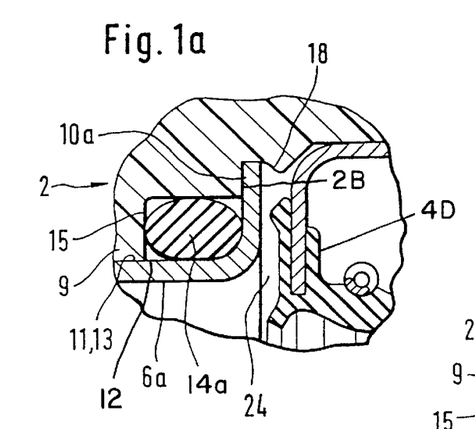
FIG. 1a is an enlarged view of a detail within the dot-dash line circle X shown in FIG. 1.

As best shown in FIG. 1a, the guide 6a can be maintained in a selected axial position relative to the housing 2 in a simple but highly reliable manner by providing the housing with a deformed or upset portion 18 in the form of an internal ring which is adjacent the radially outermost part of the end portion 10a and maintains such end portion in contact with the adjacent radially outwardly extending internal surface 2B of the centering portion 9 of the housing 2.

The portion 18 is or can be formed by displacing some material of the preferably plastic housing 2.

The deformed or upset portion 18 not only cooperates with the centering portion 9 to maintain the housing 2 and the guide 6a in optimal axial positions relative to each other, but it can also cooperate with the end portion 10a to hold the parts 2, 6a against any, or any appreciable, angular movement relative to each other. This can be achieved in a simple material- and time-saving manner by providing the end portion 10a with one or more notches, tooth spaces or analogous formations which receives or receive some material of the upset portion 18 so that the portions 10a, 18 cooperate not unlike mating teeth of gears to hold the parts 2, 6a against rotation relative to each other.

The width (radial dimension) of the annular recess 15 which is shown in FIG. 1a is exaggerated for the sake of clarity. Actually, and as already described with reference to FIG. 1, the outer diameter of the annular plenum chamber 16 greatly exceeds the outer diameter of the annular recess 15 to thus ensure that any axial forces developing in the recess 15 are active well within the region of axial pressures exerted by hydraulic fluid in the plenum chamber 16. Thus, the sealing action of the annular member 14a is effective within a region quite remote from and located radially inwardly of the surface bounding the bore or hole 7 in the housing or cylinder 2.

The making of the upset portion 18 shown in FIG. 1a can involve a heat treatment and subsequent deformation of the corresponding portion of plastic material of which the housing 2 is made. It is also possible to resort to an ultrasonic treatment of plastic material of the housing 2. Similar treatment or treatments can be resorted to in all embodiments which involve deformation and/or shifting of material of the plastic constituent(s) of the improved slave cylinder.

Figure 1B:
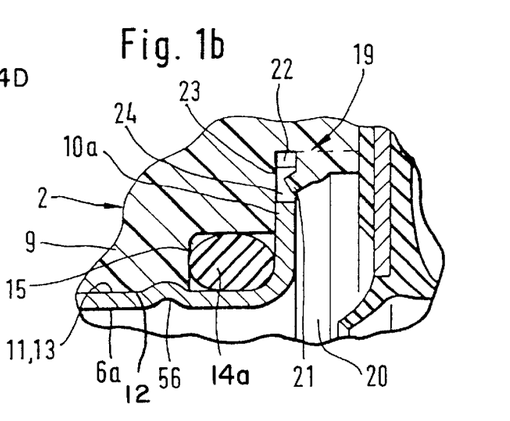
FIG. 1b is a similar enlarged view of a detail in a second clutch actuating apparatus wherein the guide and the housing are connected to each other in a different way.

FIG. 1b shows a portion of a slave cylinder which constitutes a modification of the slave cylinder 1a shown in FIGS. 1 and 1a. In this embodiment, the upset portion 18 of FIG. 1a is replaced with a bayonet lock 19 provided in a recess 20 formed in the right-hand end face of the housing 2. The bayonet lock 19 includes substantially radially inwardly extending projections 21 (only one can be seen in FIG. 1b) each of which projects into a cutout or tooth space 24 of the end portion 10a of the guide 6a. The reference character 23 denotes a stop which is provided by the right-hand end face corresponding to the internal end face 2B of the centering portion 9 shown in FIG. 1a. As shown in FIG. 1b at 22, the outer diameter of the end portion 10a can be less than the maximum diameter of the recess 20 in the right-hand end portion of the housing 2.

If the housing 2 of FIG. 1b tends to turn relative to the guide 6a and/or vice versa, the end portion 10a becomes clamped between the end face or stop 23 and the projections 21. This even further reduces the likelihood of any appreciable angular displacement of the housing and the guide 6a relative to each other.

In order to further strengthen the connection between the end portion 10a of the guide 6a and the centering portion 9 of the housing 2, the guide 6a of FIG. 1b is provided with one or more radially outwardly extending corrugations or ribs 56 each of which at least partially fills a complementary groove in the internal surface 13 of the centering portion. The corrugation(s) 56 can be maintained in mere force-locking engagement with the centering portion 9, or such corrugation(s) and the centering portion can be maintained in a form-locking engagement with one another to ensure that the guide 6a and the housing 2 are positively held against axial movement relative to each other.

The projections 21 taper, preferably gradually, radially inwardly and to the left (as viewed in FIG. 1b), i.e., toward the stop 23 of the centering portion 9 of the housing 2. Thus, the distance 22 is the maximum distance between the (radially outermost portion of the) projection 21 shown in FIG. 1b and the stop 22. Other types of couplings which establish connections serving to prevent angular and/or axial movements of the housing 2 and guide 6a of FIGS. 1–1a and 1b relative to each other can be utilized in addition to or in lieu of those described hereinbefore.

The end portion 10a can constitute a composite or a circumferentially complete ring-shaped part of the tubular guide 6a which latter can be made in a machine other than a lathe or another material removing machine, e.g., in a deep drawing machine designed to make shaped products of metallic sheet material. An advantage of the end portion 10a (regardless of whether it constitutes a circumferentially complete part or a part consisting of an annular array of discrete radially outwardly extending projections extending from one end of the main portion 8 of the guide 6a) is that it allows for the assembly of the housing 2 and the guide 6a in an automaton or in an automated machine in a highly predictable and reproducible manner. This also applies for the sealing element 14a which can be placed around the guide 6a (next to the end portion 10a) or into the recess 15 of the centering portion 9 prior to assembly of the housing with the guide.

The right-hand end face of the housing 2 has an annular recess 2C which receives the end portion 10a prior to completed assembly of the slave cylinder 1a with the support 4, namely prior to insertion into the support of an annular seal 4D which operates between the support and the shaft 5. The procedure of assembling the slave cylinder 1a with the support 4 further includes insertion into the housing 2 of a coil spring 75 or another suitable resilient element which pulls a clutch release bearing 32 in a direction to the right or pushes this bearing in a direction to the left (as viewed in FIG. 1). The bearing 32 can be mounted on the piston 3 prior to insertion of the piston into the annular cylinder space between the internal surface of the housing and the external surface of the major part 8 of the guide 6a, and a stop 30 is mounted on the left-hand (second) end portion 31 of the guide 6a in the next step to thus determine (limit) the extent of movability of the piston 3 in a direction away from the end portion 10a. The connection 30, 31 will be described in greater detail with reference to FIGS. 2 and 2a.

The maximum outer diameter of the end portion 10a can equal or closely approximate the diameter of the recess 2C in the male coupling member 2A to thus enhance the centering action of the annular portion 9. The end portion 10a may but need not completely fill the recess 2C between the end face 2B and the annular seal 4D. If the recess 2C is deeper than the wall thickness of the end portion 10a, the unoccupied portion of this recess can be utilized to receive a suitable closure or lid which urges the end portion 10a against the radial surface or end face 2D in the deepmost portion of such recess 2C.

In order to reduce the likelihood of damage to the external surface 12 of the guide 6a, i.e., in order to ensure the establishment of a highly satisfactory sealing engagement between the surface 12 and the internal surface of the annular seal 17 at the right-hand axial end of the piston 3, the diameter of the surface 12 is increased at least in the region of the end portion 10a. The increase of diameter should suffice to ensure the establishment of a reliable seal between the end portion 10a and the centering portion 9 but to avoid excessive friction between the guide 6a and the piston 3.

A tilting of the guide 6a relative to the housing 2 is avoided (or the likelihood of such tilting is greatly reduced) by the aforediscussed expedient of appropriate selection of the ratio of D to L, i.e., of the ratio of the inner diameter of the annular centering portion 9 to the axial length of such centering portion. As also mentioned hereinbefore, it has been ascertained that a tilting of the guide 6a is highly unlikely to occur if the ratio D:L is or exceeds 3:1.

It is possible to further enhance the stability of the connection between the centering portion 9 and the end portion 10a by resorting to a suitable adhesive. The adhesive is preferably selected in such a way that it can stand elevated temperatures and that its bonding action and/or its useful life is not affected by the nature of hydraulic fluid (such as a brake fluid) which is utilized to move the piston 3 axially of the housing 2 and guide 6a. Furthermore, and since the guide 6a normally consists of a metallic material (such as steel or aluminum) and the housing 2 normally consists of a suitable plastic material, the adhesive should be selected with a view to establish a reliable long-lasting bond between such metallic and plastic components. The adhesive can serve to enhance the strength of the connection between the end portion 10a and the centering portion 9 and/or to enhance the sealing engagement between such parts.

Still further, it is within the purview of the present invention to employ suitable substances which reduce the likelihood of tribo corrosion (contact corrosion). For example, the internal surface of the centering portion 10a can be coated with a suitable corrosion-reducing or corrosion-preventing substance. Such substance can be applied in the region(s) where the cylindrical surface and/or the radially extending surface of the end portion 10a contacts the housing 2. It is also possible to reduce the likelihood of tribo corrosion by subjecting the surface or surfaces of the guide 6a (e.g., the surface or surfaces of the end portion 10a) to an anodizing or hard anodizing treatment and/or by coating such surface(s) with a suitable synthetic plastic material.

It is also possible to establish a reliable form-locking connection which holds the guide 6a against undesirable axial and/or angular movements relative to the annular centering portion 9 and/or vice versa. For example, the internal surface and/or the right-hand end face of the centering portion 9, and/or the external surface or the left-hand radial surface of the end portion 10a, can be provided with axially parallel and/or radially and/or circumferentially and/or otherwise extending or oriented grooves, ribs and/or analogous formations which hold the parts 9 and 10a against movement relative to each other in one or more directions.

Figure 2:
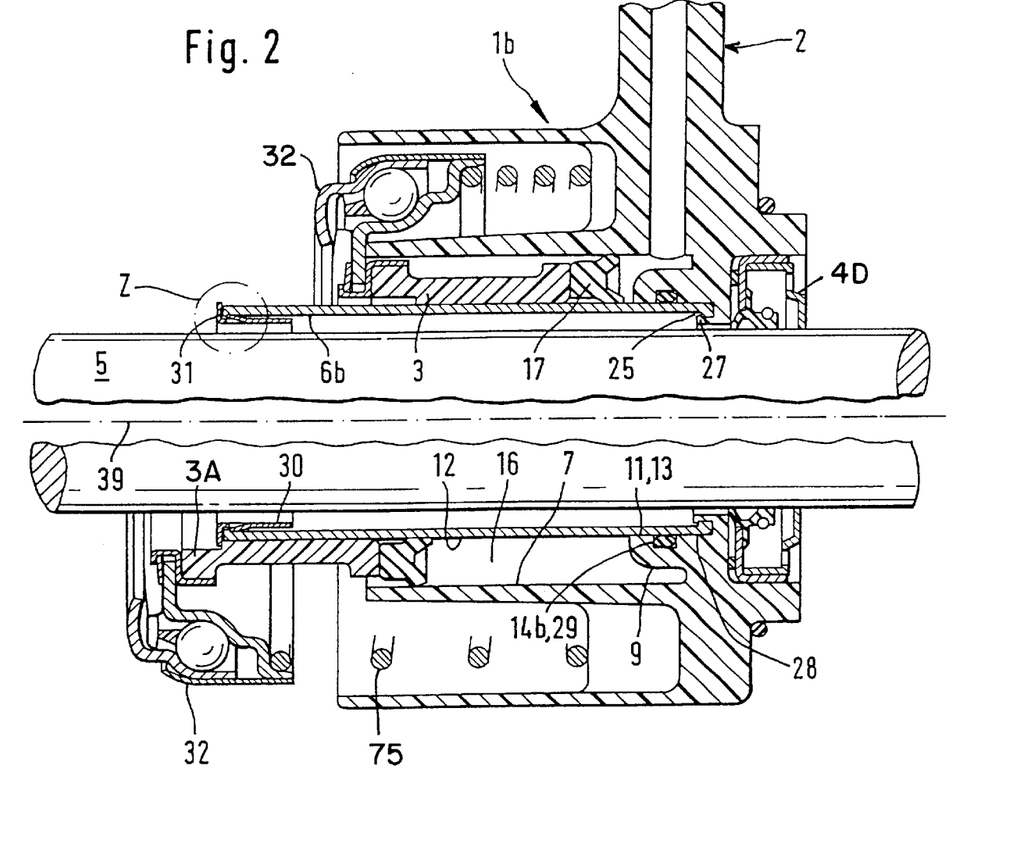
FIG. 2 is a fragmentary axial sectional view similar to that of FIG. 1 but showing a different connection between one end portion of the sleeve-like guide and the housing.
Figure 2A:
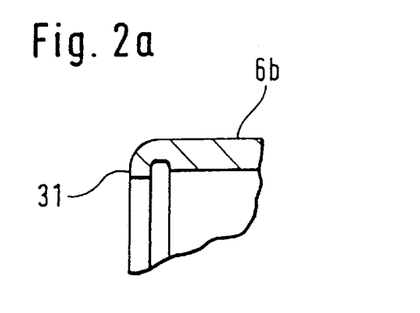
FIG. 2a is an enlarged view of a detail within the dot-dash line circle Z shown in FIG. 2.

FIGS. 2 and 2a illustrate certain details of a further slave cylinder 1b. Those parts of the cylinder 1b which are identical with or plainly analogous to the corresponding parts of the slave cylinder 1a of FIGS. 1, 1a or FIG. 1b are denoted by similar reference characters. This also applies for the parts of the slave cylinders shown in FIGS. 3 to 7.

The slave cylinder 1b comprises a sleeve-like guide 6b having an end portion 28 which is a press fit in the centering portion 9 of the housing or cylinder 2. The centering portion 9 is stepped and its radially innermost step or section is provided with a lateral annular groove 25 for the end portion 28 of the guide 6b. This results in the establishment of a reliable connection between the parts 2 and 6b. The reliability of such connection is enhanced by the provision of a retainer 27 which is constituted by a deformed (upset) portion or wall of the housing 2 adjacent the groove 25; the upset portion bears upon the adjacent surface of the guide 6b.

The annular clearance 11 between the external surface 12 of the guide 6b and the internal surface 13 of the housing 2 is sealed by an annular sealing element 14b which is received in an internal groove 29 of the centering portion 9.

That (second) end portion 31 of the guide 6b which is remote from the end portion 28 carries the aforementioned ring-shaped stop 30 which is engaged by the radially inwardly extending collar of the end portion 31 (see also FIG. 2a) of the guide 6b to hold the stop 30 in the illustrated axial position. For example, the collar of the end portion 31 can engage the stop 30 by snap action. The stop 30 determines the extent of leftward movement of the piston 3 within the housing 2; this stop can be caused to engage the collar of the end portion 31 in the plant in which the slave cylinder 1b is assembled so that the parts 2, 3, 6b, 14b, 30 constitute a module which can be stored or transported to an automobile making plant in fully assembled condition for attachment to the case (4 in FIG. 1) of a change-speed transmission or to another suitable support. The just mentioned module can further include a clutch release bearing 32 (see also FIG. 1) of any suitable design. In FIG. 1, the clutch release bearing 32 is mounted on the left-hand end portion 3A of the piston 3 in the same manner as shown in FIG. 2, i.e., the release bearing shares all axial movements of the piston 3 relative to the housing 2.

Referring again to FIG. 2a, it will be seen that the inner diameter of the radially inwardly extending collar of the second end portion 31 is somewhat less than the inner diameter of the major portion of the guide 6b; this suffices to ensure the establishment of reliable engagement of the collar of the end portion 31 with the stop 30 (not shown in FIG. 2a). The latter can be provided with an annulus of resilient prongs (not specifically shown) which engage the collar of the end portion 31 by snap action.

The stop 30 performs an additional important function, namely that or preventing accidental separation of the piston 3 from the housing 2. Thus, if the stop 30 is coupled to the collar of the end portion 31 in the manufacturing plant subsequent to insertion of the piston 3 into the plenum chamber 16, the piston cannot be detached from the housing 2 and/or from the guide 6b during storage and/or during transport to storage and/or during transport to the automobile making plant from the manufactoring plant or from storage.

The stop 30 and the collar of the end portion 31 can be omitted if the end portion 31 of the guide 6b is provided with a radially inwardly extending flange subsequent to assembly of the parts 2, 3 and 6b; such flange then prevents separation of the piston from the guide and/or from the housing. The making of the just discussed radially extending flange can involve a rolling, flanging, crimping or an analogous treatment of that end portion (31) of the guide 6b which is remote from the end portion 28.

Figure 3:
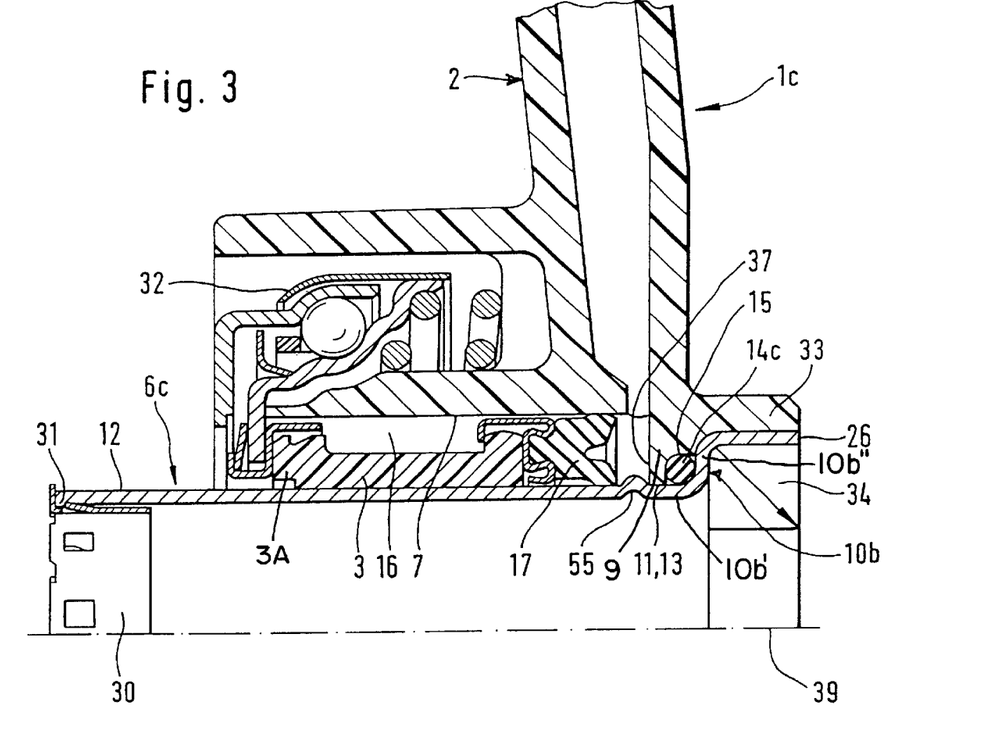
FIG. 3 is a fragmentary axial sectional view of an apparatus wherein the housing is connected with a larger-diameter end portion of the sleeve-like guide.

FIG. 3 illustrates certain relevant details of a further slave cylinder 1c which employs a modified tubular guide 6c for the piston 3, its annular seal 17 and the release bearing 32. The right-hand end portion 10b of the guide 6c is stepped (i.e., it includes several portions or sections having different inner and/or outer diameters and/or orientations) and is a tight fit in the annular centering portion 9 of the housing 2. The end portion 10b includes a cylindrical section 10b' which is surrounded by the annular sealing element 14c, a radially outwardly extending section or flange 10b", and a cylindrical radially outermost section or extension 26. The flange 10b" abuts a radially extending surface 9a (see FIG. 3a) of the centering portion 9.

The cylindrical extension or section 26 of the end portion 10b is a snug fit in and is fully surrounded by a tubular envelope 33 of the housing 2. The character 34 denotes a corrugated annular seal which is surrounded by the extension 26 and sealingly engages and surrounds a rotary part corresponding to the shaft 5 shown in FIG. 1. The seal 34 abuts the adjacent (right-hand) side of the radially extending flange 10b" of the end portion 10b of the guide 6c. The axis 39 of the shaft 5 coincides with the common axis of the parts 2, 3, 6c; this shaft transmits torque between the clutch and the transmission when the piston 3 of FIG. 3 causes the bearing 32 to engage the clutch, e.g., when the end portion 3A of the piston 3 shown in FIG. 3 abuts the stop 30 on the end portion 31 of the guide 6c.

The annular sealing element 14c of FIG. 3 is utilized to establish a seal between the centering portion 9 of the housing 2 and the end portion 10b of the guide 6c; this sealing element is received in a ring-shaped internal groove 15 of the centering portion 9 and sealingly engages and surrounds the junction between the sections 10b', 10b" of the end portion 10b. The groove 15 can be obtained by removing material from the internal surface of the centering portion 9 and/or by displacing some material of such centering portion in directions away from the sections 10b', 10b" of the end portion 10b.

Actual centering of the end portion 10b in the annular portion 9 is effected by the tubular envelope 33 which forms part of the housing 2 and snugly receives the cylindrical extension 26 of the end portion 10b; the engagement is preferably such that the extension 26 tends to expand the envelope 33 and that this envelope tends to reduce the outer diameter of the extension 26.

In order to ensure that the axial positions of the guide 6c and the housing 2 remain unchanged, the guide is provided with an external annular corrugation or bead 55 which is adjacent the section 10b' of the end portion 10b and cooperates with a radial shoulder 37 of the housing 2 so that the radially extending section 10b" is compelled to abut the adjacent radial surface 9a of the centering portion 9.

Figure 3A:
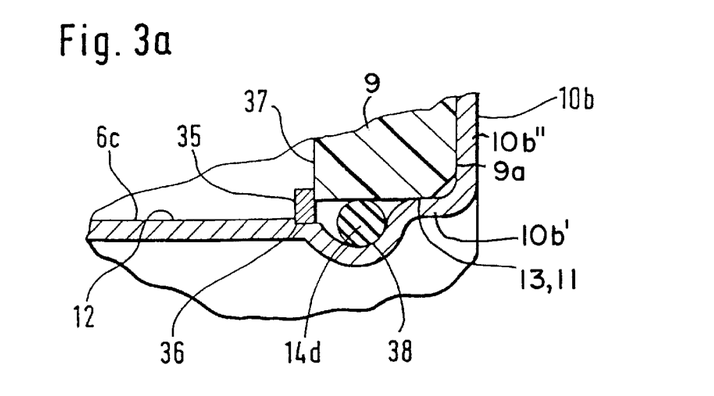
FIG. 3a is an enlarged fragmentary axial sectional view of a detail in an apparatus constituting a modification of the apparatus shown in FIG. 3.

The bead 55 can be omitted if the guide 6c and the centering portion 9 of the housing 2 are locked against axial movement relative to each other in a manner as shown in FIG. 3a. The bead 55 of FIG. 3 is replaced with a discrete annular retaining means 35 in the form of a circumferentially complete ring or a split ring which is received in a shallow external annular recess 36 in the external surface 12 of the guide 6c. The radially extending right-hand surface of the retaining ring 35 abuts the aforementioned radial shoulder 37 of the annular centering portion 9 of the housing 2. The annular sealing element 14d of FIG. 3a is received in an annular groove or recess 38 provided in the external surface 12 of the guide 6c adjacent the recess 36 for the retaining ring 35. When properly installed in the recess 36, the element 14d of FIG. 3a seals the annular clearance 11 from the plenum chamber 16 (not shown in FIG. 3a).

In all other respects, the slave cylinder embodying the structure of FIG. 3a is or can be identical with the slave cylinder 1c of FIG. 3, and (save for the distinguishing features pointed out hereinbefore) the slave cylinder 1c is or can be identical with the slave cylinder 1a and/or 1b.

An advantage of the sections 10b' and 10b" and of the extension 26 is that the centering of the guide 6c in the housing 2 is even more reliable and predictable than in the slave cylinders 1a and 1b. This is due to a pronounced increase in the areas of contact between the annular centering portion 9 of the housing 2 and the end portion 10b of the guide 6c. The reliability of the centering action is enhanced if the section 10b" is normal to the axis 39 and the section 10b' and the extension 26 are cylinders coaxial with the major portion of the guide 1c.

Figure 4:
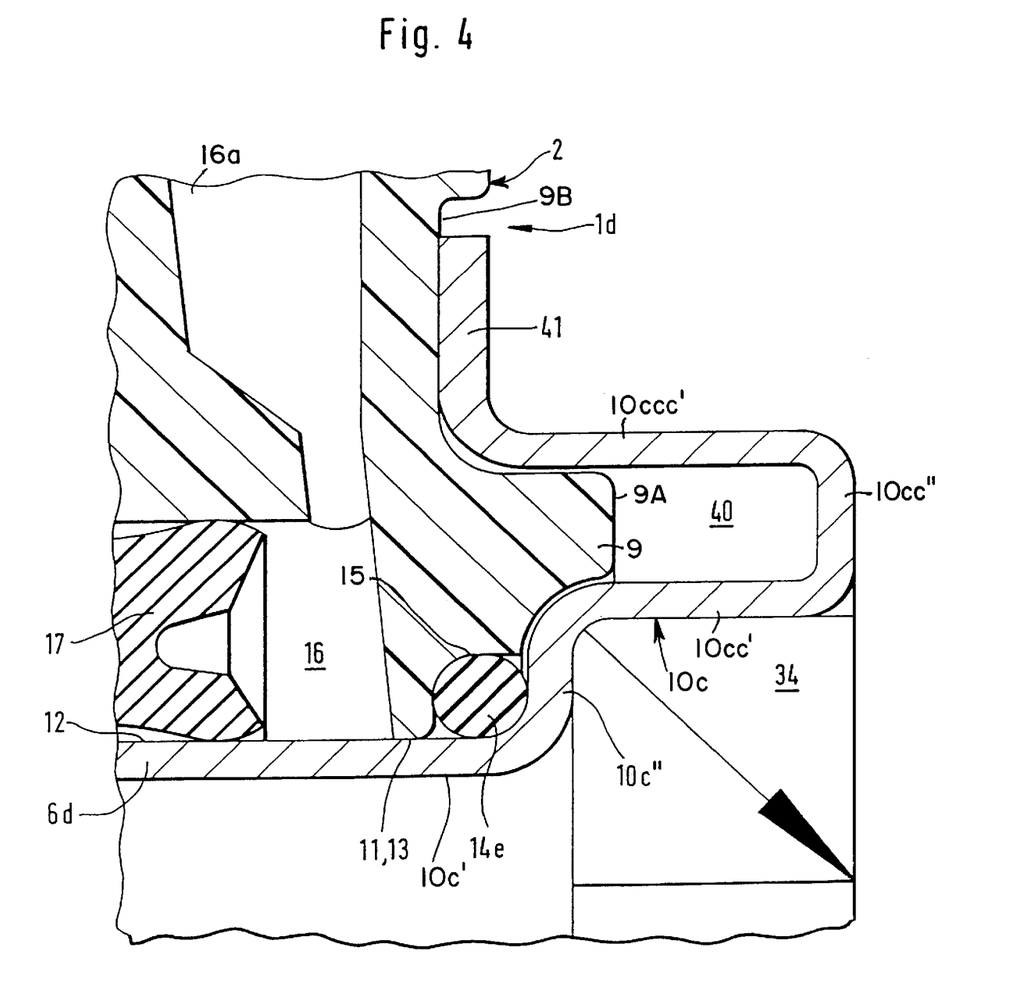
FIG. 4 is a fragmentary axial sectional view of an apparatus wherein the connection between one end portion of the guide and the housing is constructed in accordance with a further embodiment of the present invention.

Referring to FIG. 4, there is shown a portion of a slave cylinder id wherein the connection between the centering portion 9 of the housing 2 and the end portion 10c of the guide 6d is configurated and established in a different way. The end portion 10c includes a cylindrical radially innermost section 10c', a first radially extending section 10c" of one piece with the section 10c', a second cylindrical section 10cc' of one piece with the section 10c", a second radially extending section 10cc" of one piece with the section 10cc', a third cylindrical section 10ccc' of one piece with the section 10cc", and a third radially extending section or extension 41 of one piece with the section 10ccc'.

The centering portion 9 cooperates with the sections 10c", 10cc', 10cc" and 10ccc' to define an annular compartment 40 extending (axially of the guide 6d) from the section 10cc" to a radially extending end face 9A of the centering portion 9. The radially outermost portion of the compartment 40 is sealed by the radially extending section or extension 41 of the end portion 10c and the adjacent radially extending surface 9B of the centering portion 9. The surface 9B further serves to hold the guide 6d against axial movement relative to the housing 2 (namely in a direction to the left, as viewed in FIG. 4).

The centering action of the annular portion 9 of the housing 2 upon the guide 6d is effected by the internal surface 13 of the housing 2 in cooperation with the external surface 12 of the major portion of the guide. The internal surface 13 is provided with a circumferentially complete groove 15 for the annular sealing element 14e which seals the annular clearance 11 (and hence the plenum chamber 16) from the atmosphere. The reference character 16a denotes a duct or channel or bore for admission of pressurized hydraulic fluid into and/or for evacuation of such fluid from the chamber 16.

The annular sealing element 14e is or can be identical with the sealing element 14c of FIG. 3; the same holds true for the corrugated annular seal 34 shown in FIG. 4. The latter Figure merely shows the annular seal 17 at the right-hand axial end of the annular piston which is reciprocable between the housing 2 and the guide 6d.

The sections 10c', 10cc' and 10ccc' can constitute three cylinders which are coaxial with each other and with the major portion of the guide 6d, and the sections 10c", 10cc" and 41 can constitute annular walls which are normal to the common axis of the guide 6d and the housing 2. The annular compartment 40 is sealed from the atmosphere by the wall or section 41 and from the annular clearance 11 by the at least slightly deformed sealing element 14e. The annular centering portion 9 cooperates with the end portion 10c to ensure the establishment of an even larger area of contact between the housing 2 and the guide 6d at the annular sealing element 14e, i.e., an even more reliable sealing of the plenum chamber 16 from the atmosphere. The parts 6d, 2 can be assembled in an automatic machine wherein the sealing element 14e is inserted into the recess 15 prior to introduction of the major part or portion of the guide 6d into the housing 2 until the section 41 reaches and abuts the adjacent radial surface 9B of the centering portion 9.

Figure 5:
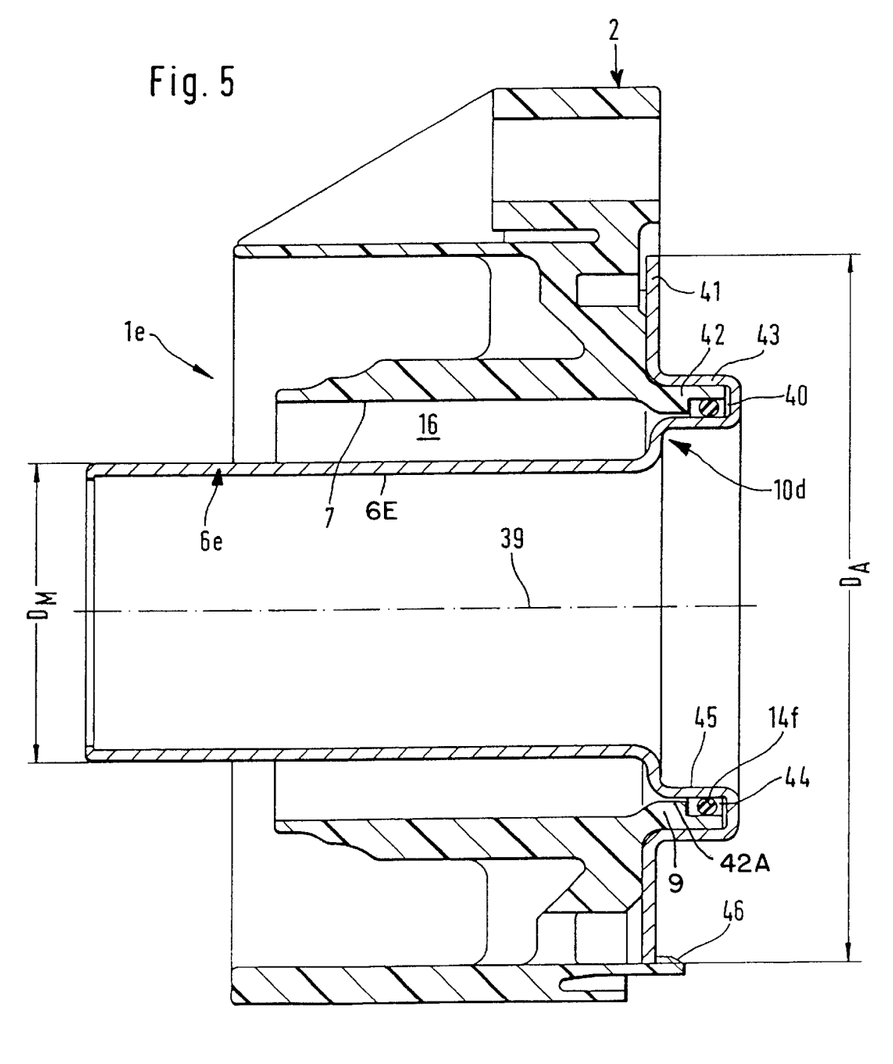
FIG. 5 is a fragmentary axial sectional view of a clutch actuating apparatus constituting a modification of the apparatus shown in FIG. 4.

FIG. 5 illustrates a portion of a further slave cylinder 1e with a different connection between the end portion 10d of the guide 6e and the centering portion 9 of the housing 2. The connection is somewhat similar to the aforedescribed connection between the end portion 10c of the guide 6d and the centering portion 9 of the housing 2 shown in FIG. 4. The end portion 10d and the centering portion 9 of FIG. 5 also define an annular compartment 40 which is filled by the part 42 of the centering portion 9 save for an annular recess 44 provided in the internal surface 42A of the portion 9 and receiving a ring-shaped sealing element 14f.

Centering of the guide 6e in the housing 2 of FIG. 5 is effected by the cylindrical section 43 of the end portion 10d in cooperation with the external surface of the part 42 of the centering portion 9. The section 43 is of one piece with the radially outwardly extending section 41 which cooperates with the housing 2 to prevent leftward axial movements of the guide 6e as well as to reliably couple the guide to the housing 2. The section 45 of the end portion 10d corresponds to the section 10cc' of the end portion 10c shown in FIG. 4.

The outer diameter of the recess 44 for the sealing element 14f at most equals the outer diameter of the bore or hole 7 in the housing 2. This ensures that, when the plenum chamber 16 is filled with a pressurized fluid (such as a hydraulic fluid), the axial stresses developing in the internal recess 44 are not felt at a radial distance from the axis 39 greater than the radial distance of forces developing in the chamber 16 and acting in the direction of such axis. In other words, the slave cylinder 1e of FIG. 5 is also designed with a view to ensure that no additional (resultant) forces can develop to act upon the parts of the slave cylinder 1e radially outwardly of the surface, bounding the bore or hole 7 of the housing 2.

The mechanical connection between the radially outermost radial section 41 of the end portion 10d and the housing 2 is designed to hold the end portion 10d against axial movement relative to the annular centering portion 9 by snap action. The housing 2 is provided with at least one resilient protuberance or tooth 46 or with an annulus of two or more radially flexible protuberances or teeth which bears or bear upon the adjacent exposed radial surface of the section 41 but can be disengaged from the section 41, e.g., to inspect and (if necessary) replace the sealing element 14f. The protuberance(s) 46 can form part of the housing 2 if the material (e.g., a plastic substance) of the housing is sufficiently resilient to ensure the establishment of a reliable but releasable (separable) connection.

The maximum diameter $D_A$ of the (section 41 of the)end portion 10d preferably exceeds the outer diameter $D_M$ of the main portion 6E of the guide 6e to a considerable extent; for example, the ratio of $D_A$ to $D_M$ should at least match but can (considerably) exceed 1.2:1. Such selection of the diameter $D_A$ relative to the diameter $D_M$ ensures the establishment of a reliable centering action for the end portion 10d, i.e., proper guidance of the piston (not shown in FIG. 5) between the external surface of the main portion 6E of the guide 6e and the internal surface of that part of the housing 2 which surrounds the plenum chamber 16.

Figure 6:
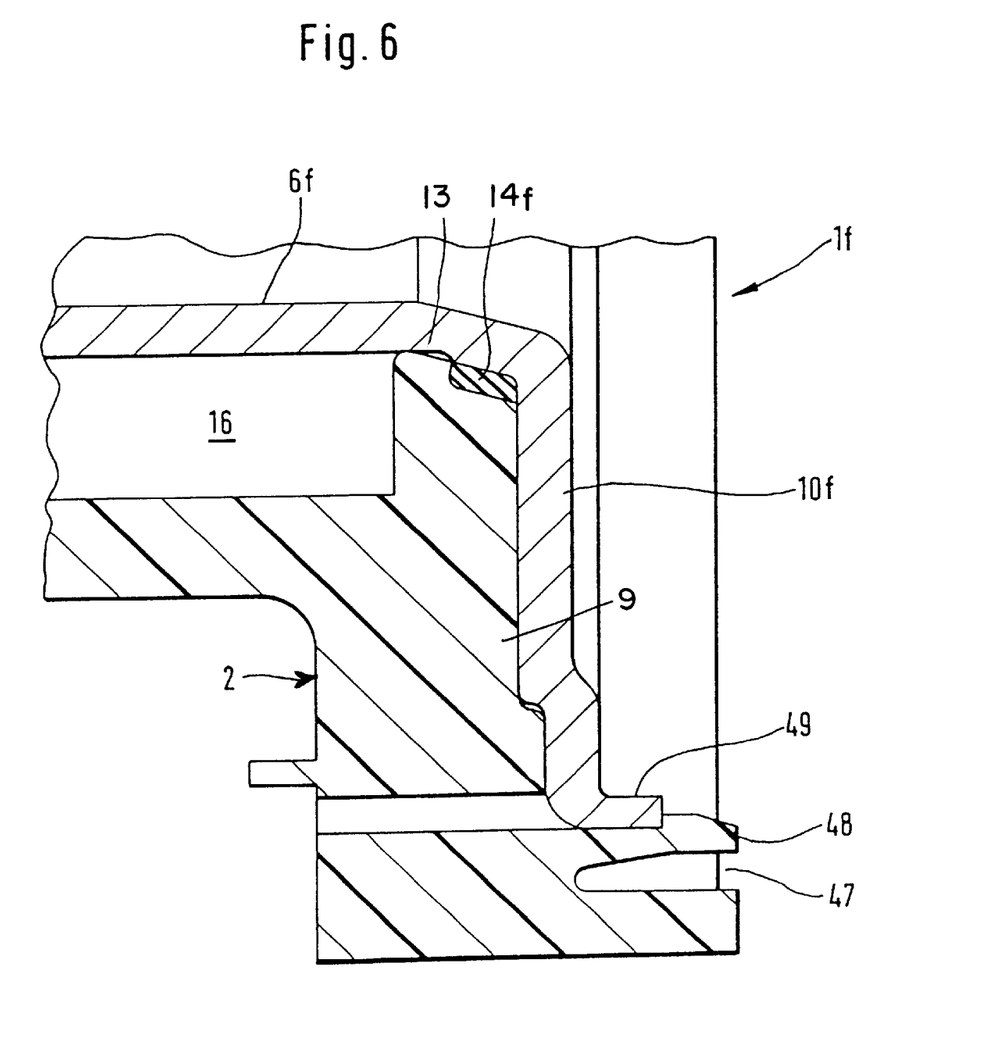
FIG. 6 is a fragmentary axial sectional view of an apparatus wherein the guide and the housing are connected to each other by snap action.

Referring to FIG. 6, there is shown a portion of a slave cylinder 1f employing a readily separable connection between the end portion 10f of the guide 6f and the centering portion 9 of the housing 2. The connection operates with snap action and employs at least one resilient protuberance or tooth 48 provided on or forming part of the housing 2 and engaging the right-hand end face of a tubular section or extension at the radially outermost end of the end portion 10f. The protuberance 48 is radially inwardly adjacent an axially extending slit 47 which enables the protuberance to move radially outwardly in response to the exertion of adequate force and to thus permit separation of the end portion 10f from a cylinder 49 of the centering portion 9.

The cross-sectional outline of the sealing element 14f departs from those of the sealing elements shown in FIGS. 1 to 5, at least when the sealing element 14f is properly installed between the internal surface 13 of the housing 2 and the adjacent external surface of the guide 6f.

Figure 7:
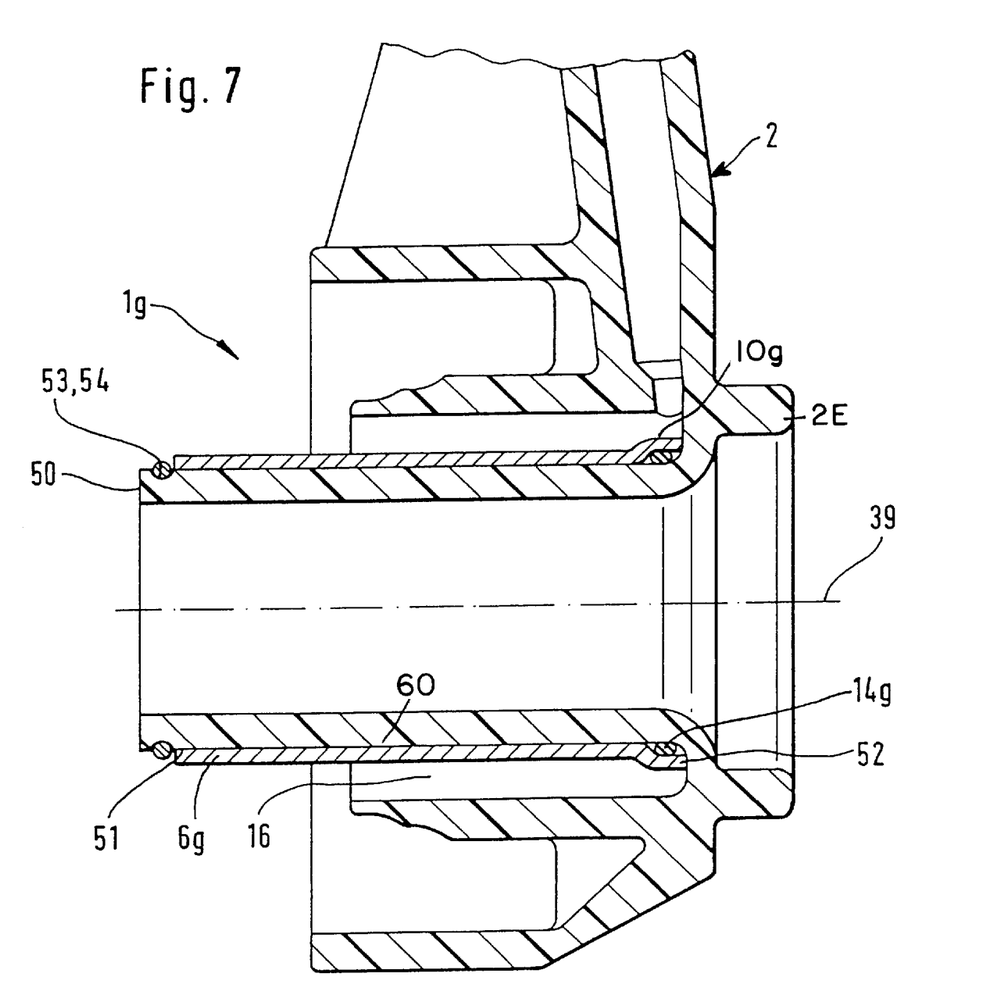
FIG. 7 is a fragmentary axial sectional view of an apparatus wherein the guide is mounted on and surrounds a cylindrical inner wall of the housing.

FIG. 7 illustrates a portion of a slave cylinder 1g having a housing 2 and a modified guide 6g. The housing 2 includes a cylindrical wall 50 which is surrounded by and is or can be a press fit in the central portion 60 of the guide 6g. The left-hand end portion 51 of the guide 6g is held against leftward movement relative to the housing 2 by a split ring 53 which is partially received in an external groove 54 of the cylindrical wall 50.

The right-hand end portion 10g of the guide 6g includes or constitutes a radially outwardly extending ring-shaped bead 52 which surrounds and sealingly engages a deformable annular sealing element 14g serving to seal the right-hand end portion of the plenum chamber 16 from the atmosphere.

The guide 6g is or can be made of a suitable metallic-material, such as steel or aluminum.

An advantage of the slave cylinder 1g is that it can employ a relatively short guide 6g. Thus, the right-hand end portion 10g of the guide 6g need not extend beyond the sealing element 14g, and the overall length of this guide need not exceed the length of the cylindrical wall 50. Furthermore, it suffices to connect only one end portion (51) of the guide 6g to the housing 2 because the other end portion 10g of the guide simply abuts the right-hand end portion of the wall 50.

The annular seal 4D (not shown in FIG. 7) can be installed on the cylindrical extension 2E of the housing 2 prior or subsequent to assembly of the housing 2 with the guide 1g. The reason is that the guide 1g can be slipped onto the cylindrical wall 50 from the left-hand end (as viewed in FIG. 7) and the seal 4D can be slipped onto the extension 2E prior or subsequent to introduction of the wall 50 into the guide 1g. The seal 4D can be slipped onto the extension 2E prior to attachment of the housing 2 to the case (4) of a transmission; alternatively, the seal 4D can be inserted into a suitable annular recess of the transmission case and the extension 2E is thereupon introduced into the thus installed seal 4D.

The cost of the guide 6g is or can be a small fraction of the cost of a guide (such as 6d) which has a rather elaborate sealingly engageable end portion (10c). The reason is that the making of the guide 6g necessitates the use of a smaller quantity of (normally) metallic material and also because the guide 6g is a simple cylinder which (if constructed exactly as shown in FIG. 7) is merely provided with a simple annular bead 52 for the sealing element 14g. The making of the guide 6g necessitates the treatment of a cylindrical blank in a single shaping machine (such as a deep drawing machine); on the other hand, the making of a guide 6d normally necessitates treatment of a cylindrical blank or preform in at least two different machines, such as a deep drawing machine and a press which provides the sections 10c'–41, i.e., which imparts to the end portion 10c the final shape shown in FIG. 4. The utilization of a single machine entails savings in time and involves greatly reduced wear upon the tools and other instrumentalities which must be employed if the making of a guide (such as 6d) necessitates the use of several shaping machines.

The making of the simple guide 6g of FIG. 7 can be completed by employing a simple, compact and inexpensive press or an analogous machine which can turn out a large number of finished guides 6g per unit of time and which is in use as long as the plant is called upon to turn out slave cylinders of the type embodying the structure of FIG. 7. Still further, the number of rejects produced by a single machine is or is likely to be a small fraction of the number of rejects turned out by two or more shaping machines which are utilized to produce relatively complex or highly complex slave cylinders. All in all, the making of simple slave cylinders of the type described with reference to FIG. 7 entails a pronounced reduction of ultimate cost, a reduction of space requirements, a reduction of initial and maintenance cost of shaping machinery, a shortening of assembly time which is required for the making of modules employing guides 6g or analogous relatively simple guides, and a shortening of time for the mounting of the slave cylinder in the power train of a motor vehicle.

The reliability of the connection between the guide 6g on the one hand, and the housing 2 of FIG. 7 on the other hand, can be further enhanced by ensuring that the wall 50 is a press fit in the guide. Analogously, it is advisable to ensure that the end portion 10a of the guide 6a is a tight press fit in the annular centering portion 9 of the housing 2 shown in FIG. 1.

The slave cylinder 1b of FIG. 2 shares certain important advantages of the slave cylinder 1g which is shown in FIG. 7. Thus, the guide 6b is relatively short because its right-hand end portion 28 need not extend axially beyond the centering portion 9 but is simply confined in the annular recess 25 of the housing 2.

Various features of the slave cylinder 1a of FIG. 1 can be used in combination with or in lieu of certain features of the slave cylinders 1b to 1g, or vice versa. By way of example only, in lieu of being installed in an internal recess of the guide 6g, the sealing element log of FIG. 7 can be received in an external recess of the wall 50 or in a lateral recess of the housing 2 of the slave cylinder 9g. Furthermore, the bayonet lock 19 of FIG. 1b can be utilized in the slave cylinder 1d of FIG. 4 to urge the section or flange 41 against the adjacent portion of the housing 2; the retaining ring 35 of FIG. 3a can be employed in the slave cylinder 1a of FIGS. 1 and 1a, and so forth.

A feature which is preferably common to all described and to all illustrated embodiments of the improved slave cylinder is that the means for sealing the plenum chamber 16 from the atmosphere (i.e., the sealing means including the annular sealing element (such as 14a) between the housing 2 and the annular sleeve-like guide (such as 6a)) does not cause the generation of additional pressure-induced loads when the slave cylinder is operated to move the piston 3 axially and to thus actuate the friction clutch by way of the bearing 32. Thus, any axial stresses which develop in the region of the sealing element (such as 14a) are generated and act radially inwardly of the surface surrounding the plenum chamber 16, i.e., such stresses do not act upon the slave cylinder radially outwardly of the plenum chamber. Such design of the improved slave cylinder ensures that the resultant forces acting between the guide and the housing 2 are well below those developing in conventional slave cylinders.

An advantage of the just discussed design of the improved slave cylinder is that, even if the pressures developing during actuation of the slave cylinder are as high as 50 bar, the housing 2 can still consist of a commercially available plastic material without risking the development of excessive stresses such as could cause permanent deformation of the housing or of certain parts of the housing (e.g., of the centering portion 9 and/or of the cylindrical wall 50). The utilization of various commercially available plastic materials for the making of the housing 2 brings about numerous additional important advantages, such as lower initial cost and/or a reduction of the weight of the slave cylinder and hence also of the system (such as the power train in a motor vehicle) in which the slave cylinder is put to use.

In addition to the aforediscussed advantages of the improved slave cylinder, the placing of the annular sealing element (such as 14a) radially inwardly of the cylindrical surface surrounding the plenum chamber 16 (or at a distance not exceeding the radial distance of such cylindrical surface from the axis 39), it is possible to provide one or more rather simple and inexpensive connections (such as 18 in FIG. 1a and 21, 56 in FIG. 1b) which serve to hold the guide in an optimum axial position relative to the housing. Such simple connections suffice to prevent undesirable axial shifting of the guide because the maximum (resultant) axial forces are determined by the fluid pressure in the plenum chamber 16 and not by a sum of (a) pressures in the plenum chamber and (b) the pressures developing as a result of the placing of the annular sealing element(s) radially outwardly of the plenum chamber (as is customary in conventional slave cylinders).

As already explained hereinbefore, keeping of axial stresses at a relatively low value renders it possible to employ a relatively inexpensive housing 2 without risking excessive temporary or permanent deformation of the housing and without necessitating resort to strong and hence bulky and expensive connections between the housing and the tubular sleeve-like guide.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of clutch actuating apparatus for use in the power trains of motor vehicles and, therefore, such adaptations should and are intended to be comprehended within the meaning and range of equivalence of the appended claims.

What is claimed is:

1. A fluid-operated clutch actuating apparatus for use in a power train of a motor vehicle wherein a shaft is rotatable about a predetermined axis, comprising:

a support;

a housing mounted on said support and having a cylindrical internal surface coaxial with and spacedly surrounding said shaft;

a tubular guide surrounding said shaft and having a cylindrical external surface coaxial with and spacedly surrounded by said internal surface, said guide having an end portion in the shape of an axially widened ring groove and said housing having an axially widened portion, wherein said end portion is centered in said axially widened portion;

an annular sealing element interposed between said end portion and said axially widened portion; and an annular piston coaxial with and reciprocable between said internal and external surfaces and defining with said guide and said housing an annular plenum chamber.

2. The apparatus of claim 1, wherein said guide further includes a main portion surrounded by said chamber and having a first diameter, said end portion of said guide including a radially outermost part having a second diameter greater than said first diameter.

3. The apparatus of claim 2, wherein the ratio of said first diameter to said second diameter is between about 1 and 1.2.

4. The apparatus of claim 1, wherein said end portion of said guide includes as annular flange extending substantially radially of and away from said axis, said end portion of said guide and said housing defining an annular compartment disposed radially outwardly of said flange and having an open side confronting said centering portion of said housing, said end portion of said guide further including a second annular flange located radially outwardly of said compartment and abutting an at least substantially radially extending surface of said housing.

5. The apparatus of claim 1, wherein said end portion of said guide defines an annular compartment and said centering portion of said housing at least partially fills said compartment.

6. The apparatus of claim 1, wherein said end portion of said guide defines an annular compartment and said centering portion extends into said compartment, said centering portion having an internal surface provided with a recess for said sealing element.

7. The apparatus of claim 1, wherein said surface define an annular clearance which is sealed by said sealing element in the region of said end portion, one of said guide and said housing having at least one annular corrugation extending from one of said surface against the other of said surfaces at said sealing element.

8. The apparatus of claim 7, wherein said corrugation force-locking engages one of said guide and said housing.

9. The apparatus of claim 1, wherein at least a portion of said housing consists of a plastic material.

10. The apparatus of claim 9, wherein at least a portion of said guide consists of a metallic material.

11. The apparatus of claim 10, wherein said metallic material is selected from the group consisting of aluminum and steel.

* * * * *